United States Patent [19]

Solow

[11] Patent Number: 4,857,890

[45] Date of Patent: Aug. 15, 1989

[54] SAFETY REAR LICENSE PLATE FRAME

[75] Inventor: Joseph E. Solow, Plainview, N.Y.

[73] Assignee: Wolo Manufacturing Co., Deer Park, N.Y.

[21] Appl. No.: 162,996

[22] Filed: Mar. 2, 1988

[51] Int. Cl.$^4$ .............................................. B60Q 1/44
[52] U.S. Cl. ..................... 340/479; 362/83.2
[58] Field of Search ............... 340/99, 93, 74, 87, 340/71, 89, 479, 468; 362/253, 83.2; 40/200, 210

[56] References Cited

U.S. PATENT DOCUMENTS

| | | | |
|---|---|---|---|
| 1,468,830 | 9/1923 | Ouzoonian | 340/99 |
| 1,614,491 | 1/1927 | Potter | 340/93 |
| 1,741,610 | 12/1929 | Brooks | 340/99 |
| 1,851,825 | 3/1932 | Frizner | 340/99 |
| 2,124,829 | 7/1938 | Rioux | 340/99 |
| 2,689,948 | 9/1954 | Rothman | 340/99 |
| 3,501,742 | 3/1970 | Ellison | 340/71 |
| 3,702,459 | 11/1972 | Bauchan | 340/71 X |

Primary Examiner—Joseph A. Orsino
Assistant Examiner—Brian R. Tumm
Attorney, Agent, or Firm—Brumbaugh, Graves, Donohue & Raymond

[57] ABSTRACT

A safety license plate frame includes a lens that extends around the frame and a plurality of mini-lamps located around the frame and connected in series between an input and ground. A running lights power circuit, including, in series, a running lights connecting wire and a resistor, is connected, to the input to provide current, at reduced voltage, to the lamps when the running lights are on. A brake lights power circuit, including a brake lights connector wire, is connected to the input in parallel with the running lights circuit, to provide current at a full 12 volts when the brake is depressed.

2 Claims, 1 Drawing Sheet

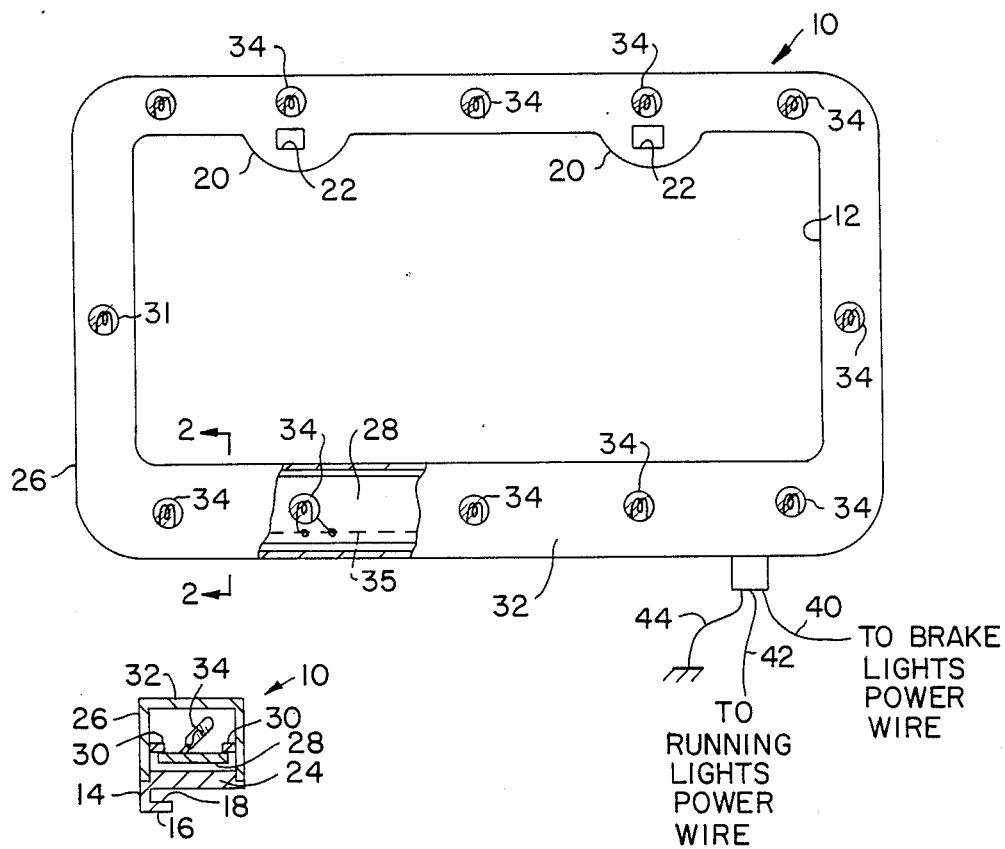
FIG. 1
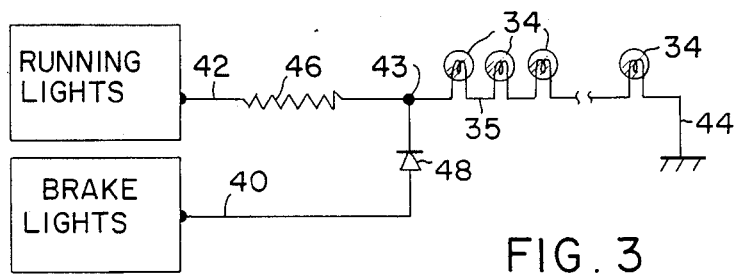
FIG. 2
FIG. 3

SAFETY REAR LICENSE PLATE FRAME

BACKGROUND OF THE INVENTION

The present invention is a license plate frame for automobiles, trucks or motorcycles.

License plates normally are attached to the vehicle body by bolts. A number of motor vehicle owners, when attaching the plates, mount their license plates in a frame which is also held by the same bolts. License plate frames are principally for decorative purposes.

Several years ago, I invented a license plate frame with an array of "moving lights" located around the frame. In this product, which is manufactured and sold by Wolo Manufacturing Corporation, the assignee of the present invention, the lights, which were mini-lamps, could be connected either to the running lights of the car, so as to be on at night, or to the brake light circuit, so as to light up when the brake was depressed. When on, the spaced lamps were controlled by a switching circuit to come on and off sequentially so as to give the appearance of moving around outside of the license plate. While the lights were decorative in nature, they also served a safety function.

SUMMARY OF THE INVENTION

The present invention is rear license plate frame having a plurality of lamps spaced around the frame, and which has a pair of parallel connectors to the running lights circuit and the brake lights circuit, respectively. The first connector includes a resistor for producing a voltage drop to the lamps when the brake circuit is off.

With a license plate frame according to the invention, each time the brakes are depressed the frame lights turn on, day or night, to augment the brake lights signal. At night the lights are on when the running lights are on (but at a reduced brightness) to improve the visibility of the vehicle to other vehicles approaching from behind. When the brake is depressed, the lights come up to fill intensity, thereby giving a braking signal.

For a better understanding of the invention, reference is made to the following detailed description of a preferred embodiment, taken in conjunction with the drawings accompanying the application.

BRIEF DESCRIPTION OF THE DRAWINGS

FIG. 1 is a top view of a rear license plate frame according to the invention;

FIG. 2 is a sectional view taken through lines 2—2 of FIG. 1; and

FIG. 3 is a circuit diagram of the lamp arrangement of the frame of FIG. 1.

DETAILED DESCRIPTION OF A PREFERRED EMBODIMENT

A license plate frame 10 according to the invention is generally rectangular in configuration to define a generally rectangular opening 12 to display a license plate (not shown). The bottom of the frame includes an outer edge 14 and one or more tabs 16 (FIG. 2) that define a slot 18 to hold the bottom edge of the license plate, and a pair of tabs 20, that project into space 12, with holes 22 that align with holes in the upper part of the license plate. In this manner, a pair of bolts (not shown) may extend through the holes 22 in the frame 10 and the corresponding holes in the license plate to mount the plate and frame 10 to a vehicle.

Referring to FIG. 2, the frame 10 includes a base 24 and a U-shaped lens 26 that fits over the base 24 to define a closed, interior space. The lens may, e.g., be of transparent or translucent plastic. A piece of printed circuit board 28 is fitted inside the lens 26 and extends all the way around the frame. The board 28 is glued to tabs 30 so that the board 28 is spaced from the upper surface 32 of the lens 26. Alternatively, the board 28 can be press fit in place. A plurality of mini-lamps 34 are mounted on the printed circuit board 28 between the board and the upper surface 32 of the lens and connected electrically as described below. The lamps 34, for example 12 lamps, are spaced around the frame as shown in FIG. 1.

The frame has three connector wires, 40, 42, and 44 that extend from the printed circuit board. Wire 40 is intended to be connected to the brake lights power wire. Wire 42 is intended to be connected to the running lights power wire. Wire 44 is ground.

Referring to FIG. 3, the lamps 34 are connected by lead 35 in series between an input 43 from the running lights 42 and brake lights 40 and output to ground 44. The running lights input circuit includes running lights power wire 42, in series with a resistor 46, for example a 3 ohm, 20 watt resistor. The brake lights input circuit, which feeds input 43 in parallel with the running lights circuit, includes brake light power wire 40 and a diode 48, which prevents the running light voltage from affecting the brake lights.

At night, when the running lights are turned on, current flows through the running lights power wire 42, through the resistor 46, to turn on lights 34. Using a 3 ohm resistor 46, the normal 12 v.d.c. vehicle voltage drops to about 9 volts at input 43, so that lights 34 are on, but not at full intensity. When the brake is depressed, 12 volt current flows through brake light power wire 40 to input 43, so that full 12 volt current is applied to lamps 34.

During the day, the lamps 34 are off except when the brakes are depressed, at which time the lamps receive full 12 volt current to augment the brake lights.

The foregoing is a description of a preferred embodiment of the invention. Variations and modifications will be apparent to persons skilled in the art without departing from the invention concepts disclosed herein. For example, the size of the frame may be varied as desired to fit different size license plates (e.g. motorcycle plates tend to be smaller). The shape of the frame, lens, and so on may also be varied as desired for aesthetic purposes. The number of lamps, as well as color, may also be varied. If desired, it is possible to employ LED's in place of minilamps. And, while the lamps are shown as connected in series, it is possible to connect the lamps in other ways, for example, so as to light sequentially as in the present Wolo product. All such modifications and variations are intended to be within the scope of the invention as defined in the following claims.

I claim:

1. A safety license plate frame for use on a vehicle having a brake light circuit and a running light circuit, said license plate frame comprising:

a frame member defining an opening for a license plate and having means for mounting a license plate to the frame member;

a plurality of lamp means positioned about said frame member;

means for electrically connecting the lamp means between an input and ground;

a running lights connecting wire having opposite ends;

first electrical connector means, including resistor means connected on one end of said running lights connecting wire and said input;

a brake lights connecting wire having opposite ends; and second electrical connector means, including diode means, connected between one end of said brake lights connecting wire and said input without a resistance drop for permitting current flow through said brake lights connecting wire in the direction of said input only; wherein the opposite ends of said running lights connecting wire and brake lights connecting wire may be connected to the running light circuit and brake light circuit, respectively, of the vehicle and the lamp means will be brighter when powered by the brake light circuit than the running lights circuit.

2. A safety license plate frame as recited in claim 1, wherein the frame member includes a lens extending around the frame, wherein said lamp means are disposed within the lens and are connected in series between said input and ground.

* * * * *